United States Patent
Kelly et al.

(10) Patent No.: US 11,560,185 B2
(45) Date of Patent: Jan. 24, 2023

(54) SYSTEM AND METHOD FOR CONTROLLING DEPLOYMENT OF A VEHICLE AIR DAM

(71) Applicant: Honda Motor Co., Ltd., Tokyo (JP)

(72) Inventors: Andrew G. Kelly, Columbus, OH (US); Adham Nidal Noubani, Findlay, OH (US); Jesse P. Stout, Columbus, OH (US); Benjamin Russel Marchese, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 16/382,954

(22) Filed: Apr. 12, 2019

(65) Prior Publication Data

US 2020/0324834 A1 Oct. 15, 2020

(51) Int. Cl.
*B62D 35/02* (2006.01)
*B62D 37/02* (2006.01)
*B62D 35/00* (2006.01)
*H02P 6/16* (2016.01)

(52) U.S. Cl.
CPC .......... *B62D 35/02* (2013.01); *B62D 35/005* (2013.01); *B62D 37/02* (2013.01); *H02P 6/16* (2013.01)

(58) Field of Classification Search
CPC .......... B62D 35/02; B62D 35/005; H02P 6/16
See application file for complete search history.

(56) References Cited

U.S. PATENT DOCUMENTS

| | | | | |
|---|---|---|---|---|
| 4,119,339 A | * | 10/1978 | Heimburger | B62D 35/005 296/180.5 |
| 4,810,022 A | * | 3/1989 | Takagi | B62D 35/005 296/180.5 |
| 4,976,489 A | * | 12/1990 | Lovelace | B62D 35/005 296/180.1 |
| 7,334,468 B2 | | 2/2008 | Browne et al. | |
| 8,060,275 B2 | * | 11/2011 | Asgari | B60W 50/0205 701/72 |
| 8,292,350 B2 | | 10/2012 | Li et al. | |
| 8,702,152 B1 | * | 4/2014 | Platto | B62D 37/02 296/180.1 |
| 8,798,868 B2 | | 8/2014 | Mares | |
| 9,067,526 B2 | | 6/2015 | Browne et al. | |

(Continued)

FOREIGN PATENT DOCUMENTS

| | | |
|---|---|---|
| DE | 102011114767 | 4/2013 |
| FR | 3014403 | 6/2015 |
| WO | 2015124281 | 8/2015 |

*Primary Examiner* — Peter D Nolan
*Assistant Examiner* — Kenneth M Dunne
(74) *Attorney, Agent, or Firm* — Mark E. Duell; Rankin, Hill & Clark LLP

(57) ABSTRACT

A system and method for controlling deployment of a vehicle air dam that include receiving vehicle data associated with a vehicle operating condition. The system and method also include analyzing the vehicle data to determine if an elevated engine load condition is present to implement a normal air dam deployment mode or a prohibitive air dam deployment mode. The system and method further include controlling an actuator associated with the vehicle air dam to deploy or retract the vehicle air dam based on the implementation of the normal air dam deployment mode or the prohibitive air dam deployment mode.

20 Claims, 7 Drawing Sheets

(56) References Cited

U.S. PATENT DOCUMENTS

| | | |
|---|---|---|
| 9,150,261 B2 | 10/2015 | DeAngelis |
| 9,308,950 B2 | 4/2016 | Wolf |
| 9,714,056 B2 | 7/2017 | Handzel, Jr. |
| 9,731,777 B2 | 8/2017 | Yoon et al. |
| 9,849,924 B2 | 12/2017 | Shami |
| 9,963,175 B2 | 5/2018 | Menicovich et al. |
| 10,065,688 B2 | 9/2018 | Heil et al. |
| 10,081,400 B2 | 9/2018 | Azizou et al. |
| 10,828,953 B2 * | 11/2020 | Anderson ............... F16F 9/512 |
| 2005/0194815 A1 * | 9/2005 | McKnight ............ B62D 35/007 296/180.5 |
| 2006/0096366 A1 * | 5/2006 | Browne ............... B62D 35/005 73/170.11 |
| 2006/0102399 A1 * | 5/2006 | Guilfoyle ............. B60K 11/085 180/68.1 |
| 2007/0257512 A1 | 11/2007 | Anderson |
| 2010/0152969 A1 * | 6/2010 | Li ...................... B60G 17/0165 701/37 |
| 2012/0330513 A1 | 12/2012 | Charnesky et al. |
| 2013/0341110 A1 * | 12/2013 | Butlin, Jr. ............ B62D 35/005 180/68.1 |
| 2017/0088192 A1 | 3/2017 | Auden et al. |
| 2017/0137074 A1 * | 5/2017 | Miller .................. B62D 35/005 |
| 2017/0240225 A1 * | 8/2017 | Gaylard ................ B62D 25/12 |
| 2018/0134331 A1 | 5/2018 | Yoon et al. |
| 2018/0297647 A1 * | 10/2018 | Klop .................... B62D 35/005 |
| 2019/0084628 A1 * | 3/2019 | Povinelli ................ B62D 37/02 |
| 2019/0111932 A1 * | 4/2019 | Falconer ............... B60W 30/188 |
| 2020/0094888 A1 * | 3/2020 | Grebel .................. B62D 35/02 |
| 2020/0160625 A1 * | 5/2020 | Dudar .................. G07C 5/0808 |
| 2020/0216085 A1 * | 7/2020 | Bobier-Tiu ........... B60W 40/08 |

\* cited by examiner

SYSTEM AND METHOD FOR CONTROLLING DEPLOYMENT OF A VEHICLE AIR DAM

BACKGROUND

In some instances, vehicles may be equipped with an air dam that is located underneath the vehicle that may be utilized to reduce aerodynamic drag by channeling air away from an underbody of the vehicle. However, during operation of the air dam, one or more underbody parts of the vehicle may be susceptible to high underbody temperatures from an engine of a vehicle in situations in which the engine is under a high amount of load. For example, if a vehicle is towing another vehicle such as a boat, the engine of the vehicle may be susceptible to a higher load which may result in higher overall temperatures that may be directed towards the underbody parts of the towing vehicle.

Additionally, in certain situations, the air dam may be susceptible to contact with one or more physical obstructions that may result from an uneven travel path of the vehicle such as a roadway on which the vehicle is traveling. For example, if the vehicle is driven in inclement snowy weather, the air dam may be susceptible to contact with snow and/or ice buildup that may result from an uneven roadway that has snow and/or ice buildup.

BRIEF DESCRIPTION

According to one aspect, a computer-implemented method for controlling deployment of a vehicle air dam that includes receiving vehicle data associated with a vehicle operating condition that pertains to an operation of a vehicle. The computer-implemented method also includes analyzing the vehicle data to determine if an elevated engine load condition is present to implement a normal air dam deployment mode or a prohibitive air dam deployment mode. The deployment of the vehicle air dam is based on a speed of the vehicle during implementation of the normal air dam deployment mode. The deployment of the vehicle air dam is prohibited during the implementation of the prohibitive air dam deployment mode based on the determination that the elevated engine load condition is present. The computer-implemented method also includes controlling an actuator associated with the vehicle air dam to deploy or retract the vehicle air dam based on the implementation of the normal air dam deployment mode or the prohibitive air dam deployment mode.

According to another aspect, a computer-implemented method for controlling deployment of a vehicle air dam that includes receiving vehicle data associated with a vehicle operating condition that pertains to an operation of a vehicle. The computer-implemented method also includes analyzing the vehicle data to determine if an uneven travel path condition is present or is expected to implement a normal air dam deployment mode or a prohibitive air dam deployment mode. The deployment of the vehicle air dam is based on a speed of the vehicle during implementation of the normal air dam deployment mode. The deployment of the vehicle air dam is prohibited during the implementation of the prohibitive air dam deployment mode based on the determination that the uneven travel path condition is present or is expected. The computer-implemented method further includes controlling an actuator associated with the vehicle air dam to deploy or retract the vehicle air dam based on the implementation of the normal air dam deployment mode or the prohibitive air dam deployment mode.

According to an additional aspect, a system for controlling deployment of a vehicle air dam that includes a memory storing instructions when executed by a processor cause the processor to receive vehicle data from at least one sensor of a vehicle, wherein the vehicle data is associated with a vehicle operating condition that pertains to an operation of the vehicle. The instructions also cause the processor to analyze the vehicle data to determine if an elevated engine load condition is present to implement a normal air dam deployment mode or a prohibitive air dam deployment mode. The deployment of the vehicle air dam is based on a speed of the vehicle during implementation of the normal air dam deployment mode. The deployment of the vehicle air dam is prohibited during the implementation of the prohibitive air dam deployment mode based on the determination that the elevated engine load condition is present. The instructions further cause the processor to control an actuator associated with the vehicle air dam to deploy or retract the vehicle air dam based on the implementation of the normal air dam deployment mode or the prohibitive air dam deployment mode.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
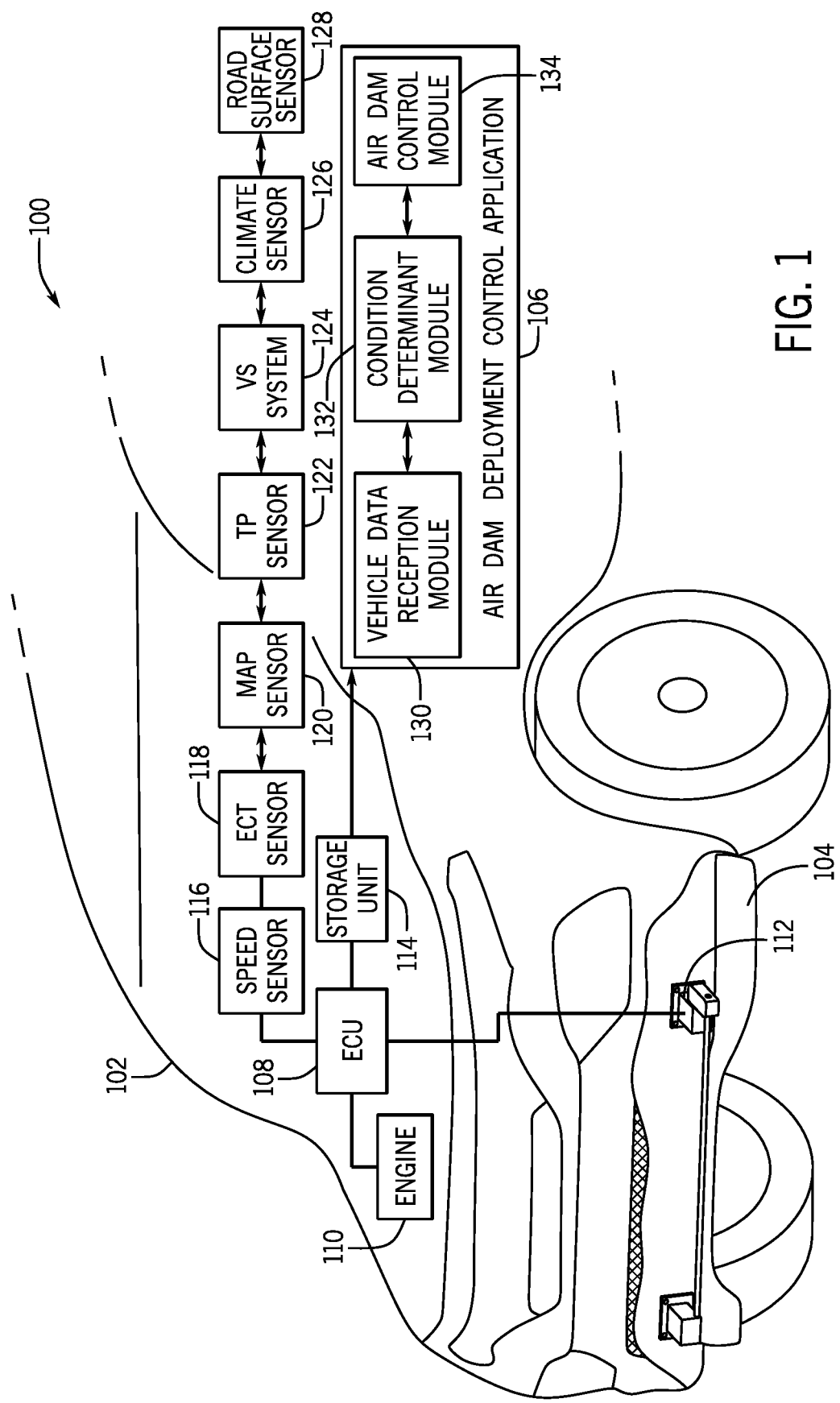
FIG. 1 is a schematic view of an exemplary system that may be utilized for a vehicle to control deployment of a vehicle air dam according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system", as used herein can include, but is not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more embodiments and now for purposes of limiting the same, FIG. 1 is a schematic view that illustrates an exemplary system 100 that may be utilized for a vehicle 102 to control deployment of a vehicle air dam (air dam) 104 according to an exemplary embodiment of the present disclosure.

Figure 2:
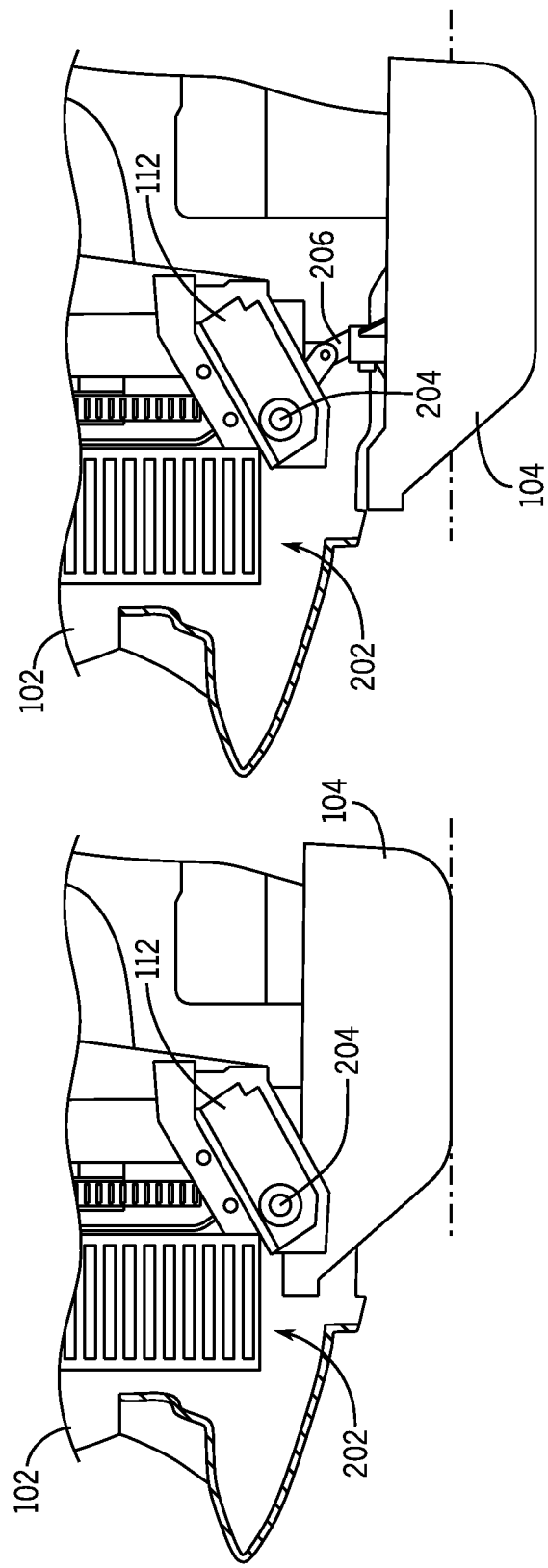
FIG. 2A is an illustrative example of the air dam positioned in a retracted state according to an exemplary embodiment of the present disclosure.
FIG. 2B is an illustrative example of the air dam positioned in a deployed state according to an exemplary embodiment of the present disclosure.

In an exemplary embodiment, the system 100 may include an air dam deployment control application (air dam control application) 106 that may be executed by an electronic control unit (ECU) 108 of the vehicle 102 to control deployment of the air dam 104 based on one or more factors, discussed below. As shown in FIGS. 2A and 2B, the application 106 may be configured to control deployment of the air dam 104 from a retracted state (shown in FIG. 2A) that is raised toward an underbody 202 of the vehicle 102 (e.g., at a longer range of distance from a ground surface) to a deployed state (shown in FIG. 2B) that is lowered away from the underbody 202 of the vehicle 102 (e.g., at a shorter range of distance from the ground surface).

The application 106 may control the deployment of the air dam 104 to improve aero-dynamic performance of the vehicle 102 and to achieve a benefit with respect to the fuel efficiency of the vehicle 102. The deployment of the air dam 104 at certain speeds may result in management of air flow away from the underbody 202 of the vehicle 102 that may reduce drag associated with one or more portions of the vehicle 102 while improving aerodynamic efficiency.

In one or more embodiments, the air dam control application 106 may implement a plurality of modes of operation that pertain to the deployment and/or the retraction of the air dam 104 during particular conditions. With respect to the present disclosure, the air dam control application 106 may implement a normal air dam deployment mode in which a speed of the vehicle 102 is utilized by the application 106 as a determining factor by which to deploy or retract the air dam 104. In particular, the application 106 may control an actuator 112 that is operably connected to the air dam 104 to deploy the air dam 104 based on the vehicle 102 being driven in a manner that reaches and/or surpasses a particular speed. Additionally, the application 106 may control the actuator 112 to retract the air dam 104 based on the vehicle 102 being driven in a manner that is below the particular speed.

With continued reference to FIG. 1 and FIGS. 2A and 2B, the air dam control application 106 may also implement a prohibitive air dam deployment mode in which an engine load on an engine 110 of the vehicle 102 may be utilized by the application 106 as a determining factor by which to deploy or retract the air dam 104. For example, within the prohibitive air dam deployment mode, the application 106 may control the actuator 112 to prohibit deployment of the air dam 104 regardless of the speed of the vehicle 102 if the engine load is determined to be elevated (e.g., high) based on an engine coolant temperature being above a particular temperature.

Additionally or alternatively, the air dam control application 106 may implement the prohibitive air dam deployment mode in which a condition of a travel path (e.g., roadway) on which the vehicle 102 is traveling is utilized as a determining factor by which to deploy or retract the air dam 104. For example, within the prohibitive air dam deployment mode, the application 106 may control the actuator 112 to prohibit deployment of the air dam 104 regardless of the speed of the vehicle 102 if an outside ambient temperature is below a particular temperature that may be utilized to predict an uneven travel path that may include potential obstructions to the air dam 104 based on potential snowy/icy conditions. It is to be appreciated that the application 106 may implement one or more additional modes of operation of the air dam 104 and/or one or more additional or alternative determining factors may be utilized within the normal air dam deployment mode, the prohibitive air dam deployment mode, and/or one or more additional modes of operation of the air dam 104.

As discussed below, the air dam control application 106 may be configured to receive vehicle data associated with one or more vehicle operating conditions that may pertain to an extent of the engine load of the vehicle 102 to determine if the engine load of the vehicle 102 is elevated (e.g., over a predetermined engine load value). Accordingly, if the engine load of the vehicle 102 is determined to be elevated, the application 106 may determine an elevated engine condition that is based on the elevated load that is placed upon the engine 110 of the vehicle 102.

Additionally, the application 106 may be configured to receive vehicle data associated with one or more vehicle operating conditions and/or one or more environmental conditions that may pertain to a travel path condition of the travel path on which the vehicle 102 is traveling to determine an uneven travel path condition. The uneven travel path condition may be based on the determination of a present (e.g., real-time) or expected unevenness of the travel path that may be caused by road conditions such as potholes, bumps, speed bumps, and the like, environmental conditions such as snow, ice, and the like, and/or extrinsic conditions such as debris, rocks, and the like that may cause one or more potential obstructions during deployment of the air dam 104.

As discussed in more detail below, the air dam control application 106 may be configured to analyze the vehicle data to determine operational data and/or environmental data that may be compared to respective thresholds to thereby implement the normal air dam deployment mode or the prohibitive air dam deployment mode based on the determination of the elevated engine load condition and/or the uneven travel path condition. The application 106 may thereby be configured to control the actuator 112 that is associated with the air dam 104 to control deployment of the air dam 104 or retraction of the air dam 104 based on the normal air dam deployment mode or the prohibitive air dam deployment mode. Accordingly, the air dam 104 may be operably controlled to be deployed (as shown in FIG. 2B) and/or retracted (as shown in FIG. 2A) based on one or more factors that may include, but may not be limited to, the speed of the vehicle 102, the engine load on the engine 110 of the vehicle 102, and/or conditions of the travel path on which the vehicle 102 is traveling.

With continued reference to FIG. 1 and to the components of the vehicle 102, the ECU 108 may be configured to execute one or more applications, operating systems, vehicle system and subsystem executable instructions, vehicle sensor logic, among others. In one or more embodiments, the ECU 108 may include a microprocessor, one or more application-specific integrated circuit(s) (ASIC), or other similar devices. The ECU 108 may also include respective internal processing memory, an interface circuit, and bus lines for transferring data, sending commands, and communicating with the plurality of components of the vehicle 102.

The ECU 108 may also include a respective communication device (not shown) for sending data internally to components of the vehicle 102 and communicating with externally hosted computing systems (not shown) (e.g., external to the vehicle 102). Generally the ECU 108 may communicate with a storage unit 114 to execute one or more applications, operating systems, vehicle systems and subsystem user interfaces, and the like that are stored on the storage unit 114. For example, the storage unit 114 may be configured to store executable data files that may be associated with execution of the air dam control application 106 by the ECU 108 of the vehicle 102.

In an exemplary embodiment, the ECU 108 may be operably connected to the actuator 112 of the air dam 104 and may be configured to send one or more command signals to the actuator 112 to operably control deployment and/or retraction of the air dam 104. As shown FIG. 2B, the air dam 104 may include a clutch 204 that is operably connected to a linkage 206 that may be extended based on the movement of the actuator 112 to deploy and lower the air dam 104 away from the underbody 202 of the vehicle 102 such that the air dam 104 is deployed to a lowered position. The linkage 206 may also be retracted from an extended position based on the movement of the actuator 112 and the linkage 206 to retract and raise the air dam 104 to a fully retracted position, as shown in FIG. 2A. In one or more embodiments, the actuator 112 and clutch 204 may be configured to protect the actuator 112 against a range of potential impact loads on the air dam 104 by allowing the clutch 204 to be disengaged upon a predetermined amount of impact and re-engaged upon retraction of the air dam 104. However, as discussed, the application 106 is configured to primarily protect the air dam 104 against potential obstruction based on the implementation of the prohibitive air dam deployment mode.

Referring again to FIG. 1, the ECU 108 may be configured to operably control, send data, and receive data from one or more components of vehicle 102 that may be utilized to determine one or more vehicle operating conditions and/or travel path conditions. In an alternate embodiment, the ECU 108 may also be configured to operably control, send data, and receive data from a plurality of vehicle systems (not shown) (e.g., vehicle safety systems such as a collision mitigation braking system) that may provide data that may pertain to one or more vehicle operating conditions and/or one or more environmental conditions.

With particular respect to the plurality of sensors of the vehicle 102, the vehicle 102 may include a speed sensor 116 that may be configured to provide a real-time (current) speed of the vehicle 102 to the ECU 108 to be communicated to the application 106. In alternate embodiments, the vehicle 102 may alternatively and/or additionally include a wheel speed sensor (not shown) that may be configured to provide the real-time speed of the vehicle 102 to the ECU 108 to be communicated to the application 106. In one configuration, the speed sensor 116 may provide the speed as a real value (e.g., 60 KPH) that is indicative of the actual real-time speed of the vehicle 102 that may be communicated to the application 106.

Figure 3:
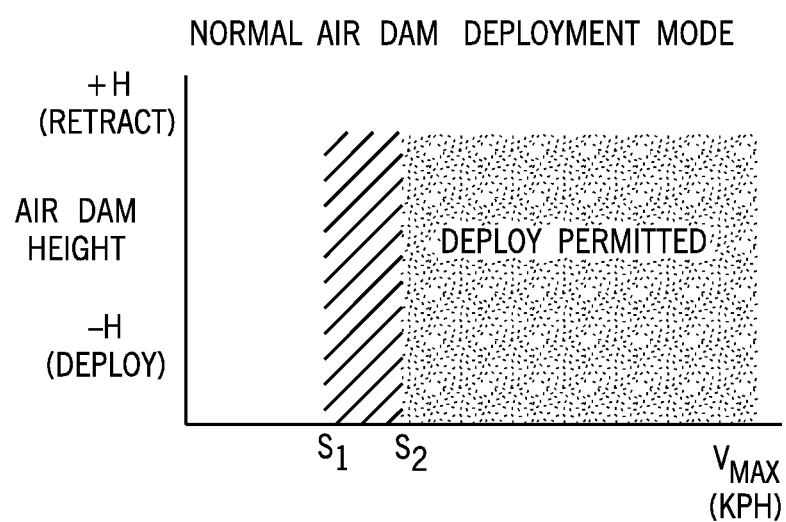
FIG. 3 is an illustrative example of an implementation of a normal air dam deployment mode implemented based on the determination of a speed of a according to an exemplary embodiment of the present disclosure.

FIG. 3 is an illustrative example of an implementation of the normal air dam deployment mode implemented based on the determination of the speed of the vehicle 102 according to an exemplary embodiment of the present disclosure. As shown, during implementation of the normal air dam deployment mode, the application 106 may utilize a predetermined speed threshold (that may be based on ranges of speeds as shown as $S_1$, $S_2$, $V_{MAX}$) that may be utilized as a threshold to be compared against the real-time speed output of the speed sensor 116. Accordingly, based on the real-time speed of the vehicle 102 output by the speed sensor 116, the application 106 may permit the deployment of the air dam 104 and may accordingly control the actuator 112 deploy the air dam 104 or retract the air dam 104.

Stated differently, when the vehicle 102 is driven at a speed below the predetermined speed threshold, deployment of the air dam may be prohibited by the application 106. Deployment of the air dam 104 may be accordingly controlled to provide benefits of the air dam 104 based on the vehicle 102 reaching and/or surpassing the predetermined speed threshold when the vehicle 102 is driven at a speed equivalent or above the predetermined speed threshold. Additionally, retraction of the air dam 104 may be controlled when the vehicle 102 slows down to a speed below the predetermined speed threshold upon/after reaching or surpassing the predetermined speed threshold.

Referring again to FIG. 1, the vehicle 102 may additionally include an engine coolant temperature sensor (ECT sensor) 118 that may be configured to measure a temperature of the coolant (e.g., water, coolant/antifreeze mix) in a cooling system of the engine 110 of the vehicle 102. The temperature measurement may measure an amount of heat the engine 110 is giving off that may be indicated by the temperature of the engine coolant. Accordingly, the engine coolant temperature may indicate the amount of load that may be placed upon the engine 110. In one embodiment, the ECT sensor 118 may be configured to output a real-time coolant temperature reading to the air dam control application 106.

As discussed below, the application 106 may compare the real-time coolant temperature reading to a predetermined coolant temperature threshold to determine if the real-time coolant temperature is equal to or above the predetermined coolant temperature threshold. If it is determined that the real-time coolant temperature is equal to or above the predetermined coolant temperature threshold, the application 106 may determine an elevated engine load condition is occurring and may thereby implement the prohibitive air dam deployment mode to control the actuator 112 to deploy the air dam 104 or retract the air dam 104 based on the prohibitive air dam deployment mode. Accordingly, the air dam 104 may be prohibited from being deployed during the elevated engine load condition. This functionality may allow maximum underbody air flow to reach the underbody 202 of the vehicle 102 to thereby cool underbody parts of the vehicle 102 from an elevated level of heat that may be caused by the elevated engine load condition.

In an exemplary embodiment, the vehicle 102 may also include a manifold absolute pressure sensor (MAP sensor) 120 that may be configured to measure air intake pressure of the engine 110. In one embodiment, the MAP sensor 120 may be configured to output a real-time air intake pressure value reading to the ECU 108. Data output by the MAP sensor 120 may be utilized by the ECU 108 to determine the engine load based on the air intake pressure. In one or more embodiments, a throttle pressure sensor (TP sensor) 122 of the vehicle 102 may be configured to sense and monitor a throttle position that may be part of an air intake system (not shown). In one configuration, the TP sensor 122 may be configured to output a real-time throttle position value reading to the ECU 108. Data output by the TP sensor 122 may be utilized by the ECU 108 to determine the engine load based on the throttle position.

In one embodiment, the ECU 108 may be configured to determine a real-time engine load percentage based on analysis of the real-time air intake pressure value reading and/or the real-time throttle position value reading respectively output by the MAP sensor 120 and/or the TP sensor 122. The ECU 108 may communicate the determined engine load percentage as a vehicle operational value to the application 106. The application 106 may thereby compare the real-time engine load percentage to a predetermined engine load threshold percentage to determine if the real-time engine load percentage is equal to or above the predetermined engine load threshold percentage. If it is determined that the real-time engine load percentage is equal to or above the predetermined engine load threshold percentage, the application 106 may implement the prohibitive air dam deployment mode to prohibit the deployment of the air dam 104 during the elevated engine load condition to allow a maximization of underbody airflow towards the underbody parts of the vehicle 102 based on a retracted state of the air dam 104.

In one or more embodiments, the vehicle 102 may include a vehicle stability system (VS system) 124 that may be configured to provide data to the ECU 108 to provide one or more autonomous safety controls. In one embodiment, the VS system 124 may be configured to communicate with one or more vehicle dynamic sensors (not shown), including, but not limited to wheel speed sensors, a lateral acceleration sensor, a steering angle sensor, and the like to determine an amount of wheel slip of one or more of the wheels (not shown) of the vehicle 102 that may indicate an oversteer or understeer condition of the vehicle 102 possibly caused uneven travel path conditions (e.g., snowy conditions).

In one configuration, the ECU 108 may be configured to communicate data provided by the VS system 124 to the air dam control application 106 as a vehicle operational value that may indicate an amount of wheel slip that may be determined. Based on the determination of amount of wheel slip, the application 106 may compare the amount of wheel slip output by the VS system 124 to a predetermined wheel slip threshold that may be utilized to indicate that the vehicle 102 is presently traveling on or is expected to travel on an uneven travel path.

Stated differently, the application 106 may determine and/or predict that the vehicle 102 is traveling and/or will travel on an uneven travel path that may include one or more potential obstructions during deployment of the air dam 104 based on determining that an amount of wheel slip (output by the VS system 124) meets or exceeds the predetermined wheel slip threshold. In one embodiment, if the amount of wheel slip is determined to meet or exceed the predetermined wheel slip threshold, the air dam control application 106 may implement the prohibitive air dam deployment mode to prohibit the deployment of the air dam 104 during the present or expected uneven travel path condition.

In an exemplary embodiment, a climate sensor 126 of the vehicle 102 may be configured to measure one or more environmental parameters associated with the external environment surrounding the vehicle 102. In particular, one or more environmental parameters may include, but may not be limited to, an outside ambient temperature, a determination of a state of precipitation (e.g., rain, snow, hail, sleet), and/or other natural conditions that may occur within the surrounding environment of the vehicle 102.

In one configuration, the ECU 108 may be configured to communicate data provided by the climate sensor 126 to the air dam control application 106 that indicates the outside ambient temperature. In one embodiment, the application 106 may compare the outside ambient temperature to a predetermined ambient temperature threshold and may thereby determine if the outside ambient temperature is equal to or below the predetermined ambient temperature threshold. In an alternate embodiment, the climate sensor 126 may be configured to sense an amount of humidity in the air to determine a state of precipitation in addition the outside ambient temperature.

If it is determined that the outside ambient temperature is equal to or below the predetermined ambient temperature threshold, the application 106 may determine and/or predict that the vehicle 102 is presently traveling on and/or is expected to travel on an uneven travel path that may include one or more potential obstructions during deployment of the air dam 104 such as snow or ice buildup. Accordingly, the air dam control application 106 may implement the prohibitive air dam deployment mode to prohibit the deployment of the air dam 104 during the uneven travel path condition.

In one or more embodiments, the ECU 108 of the vehicle 102 may additionally be operably connected to a road surface sensor 128 of the vehicle 102. The road surface sensor 128 may be configured in the form of one or more cameras, lasers, LIDARs, and/or suspension height measurement devices (all not shown) that may disposed at one or more portions of the vehicle 102 to determine conditions associated with the surface of the travel path a predetermined distance ahead of the vehicle 102. In particular, one or more cameras, lasers, and/or LIDARs, may be positioned to at an angle towards the travel path located ahead of the vehicle 102 to detect unevenness of the travel path that may be caused by road conditions such as potholes, bumps, environmental conditions such as snow and ice, or extrinsic conditions such as debris and rocks. Additionally, the suspension height measurement devices may be configured to determine changes in the height of a suspension system (not shown) of the vehicle 102 that may be caused by road conditions, environmental conditions, and/or extrinsic conditions.

In one configuration, the ECU 108 may be configured to communicate data provided by the road surface sensor 128 to the air dam control application 106 as a travel path condition value that indicates an amount of travel path unevenness that is expected in front of the vehicle 102 and/or is presently determined (in real-time) as the vehicle 102 is traveling on the travel path. In one embodiment, the application 106 may be configured to compare the travel path condition value to a predetermined travel path unevenness threshold value to determine if the travel path condition value meets or exceeds the travel path unevenness threshold value. This comparison may allow the application 106 to determine if the vehicle 102 is traveling on or is expected to travel on an uneven travel path.

Stated differently, the application 106 may determine and/or predict that the vehicle 102 is traveling on and/or will travel on an uneven travel path that may include one or more potential obstructions during deployment of the air dam 104 when the travel path condition value output by the road surface sensor 128 meets or exceeds the travel path unevenness threshold value. Accordingly, the air dam control application 106 may implement the prohibitive air dam deployment mode to prohibit the deployment of the air dam 104 during the uneven travel path condition.

It is to be appreciated that data provided by any of the aforementioned sensors and systems of the vehicle 102 may be utilized alone or in conjunction by the air dam control application 106 to analyze the vehicle data with respect to the elevated engine load condition and/or the uneven travel path condition to implement the normal air dam deployment mode or the prohibitive air dam deployment mode.

II. The Air Dam Deployment Control Application, Related Methods, and Illustrative Examples The air dam control application 106 and its components will now be discussed in more detail according to an exemplary embodiment, and with continued reference to FIG. 1. In one or more embodiments, the air dam control application 106 may be executed by the ECU 108 of the vehicle 102. In an alternate embodiment, the air dam control application 106 may be executed by another component of the vehicle 102 such as a head unit (not shown) and/or a separate controller (not shown) that may be operably connected to the actuator 112 of the air dam 104.

In an exemplary embodiment, the air dam control application 106 may include a plurality of modules, that may include, but may not be limited to a vehicle data reception module 130, a condition determinant module 132, and an air dam control module 134. However, it is to be appreciated that the air dam control application 106 may include one or more additional modules and/or sub-modules that are included in addition to the modules 130-134.

In one embodiment, the vehicle data reception module 130 may be configured to communicate with the ECU 108 to receive vehicle data associated with a vehicle operating condition and/or an environmental condition. Upon receiving the vehicle data, the vehicle data reception module 130 may be configured to communicate respective data to the condition determinant module 132 of the air dam control application 106.

As discussed in more detail below, the condition determinant module 132 may be configured to analyze the vehicle data received by the vehicle data reception module 130. In particular, the condition determinant module 132 may be configured to analyze the vehicle data to determine if the elevated engine load condition is present or an uneven travel path condition is present or expected. The condition determinant module 132 may thereby implement the normal air dam deployment mode if the elevated engine load condition is not present and/or the uneven travel path condition is not present and/or expected, such that the deployment of the air dam 104 may be based on the speed of the vehicle 102. Alternatively, the condition determinant module 132 may implement the prohibitive air dam deployment mode if the elevated engine load condition is present and/or the uneven travel path condition is present and/or expected. Upon implementing the normal air dam deployment mode or the prohibitive air dam deployment mode, the condition determinant module 132 may thereby communicate respective data to the air dam control module 134 that pertains to the implemented mode.

In an exemplary embodiment, upon receipt of the data pertaining to the implemented mode, the air dam control module 134 may be configured to communicate with the ECU 108 of the vehicle 102 to operably control the actuator 112 associated with the air dam 104 to control deployment of the air dam 104 or retraction of the air dam 104 based on the implementation of the normal air dam deployment mode or the prohibitive air dam deployment mode. Accordingly, the actuator 112 may be controlled to deploy and/or retract the air dam 104 based on the speed of the vehicle 102 (as discussed above with respect to FIG. 3 above) within the normal deployment mode. Alternatively, the actuator 112 may be controlled to prohibit deployment of the air dam 104 and/or retract the air dam 104 based on the determination of the high engine load condition and/or the uneven travel path condition. Methods and illustrative examples describing process steps that are executed by the modules 130-134 of the air dam control application 106 will now be described in more detail.

In one or more embodiments, the air dam control module 134 may also be configured to communicate with the ECU 108 to deploy or retract the air dam 104 based on user actuation or automated actuation on particular vehicle operational modes. In particular, the vehicle 102 may include an interface or physical input buttons (not shown) within the vehicle 102 that may allow the user to select and actuate one or more vehicle operational modes that may include vehicle transmission modes, vehicle driving style modes, and the like. Additionally, one or more vehicle systems may be configured to autonomously actuate a particular vehicle operational mode based on one or more driving scenarios (e.g., vehicle is being driven off-road, vehicle 102 is being driven at a certain speed). In one embodiment, such modes may include, but may not be limited to, a fuel efficient mode, a standard road driving operational mode, a sport driving operational mode, and an off-road driving operational mode.

In one configuration, during the user input of the fuel efficient mode, the standard road driving operational mode, or the sport driving operational mode, the air dam control module 134 may also be configured to communicate with the ECU 108 to deploy the air dam 104 at one or more positions such that it may be utilized as the vehicle 102 is driven on a surfaced road (e.g., which may not be uneven). In some embodiments, the air dam control module 134 may be configured to deploy the air dam 104 based on user input if the condition determinant module 132 implements the normal air dam deployment mode. Additionally, during the user input of the off-road driving operational mode, the air dam control module 134 may be configured to communicate with the ECU 108 to retract the air dam 104 and/or prohibit the deployment of the air dam 104 to ensure it is not deployed as the off-road driving operational mode is actuated as the vehicle 102 may potentially driven within an off-road environment (e.g., on uneven surfaces).

Figure 4:
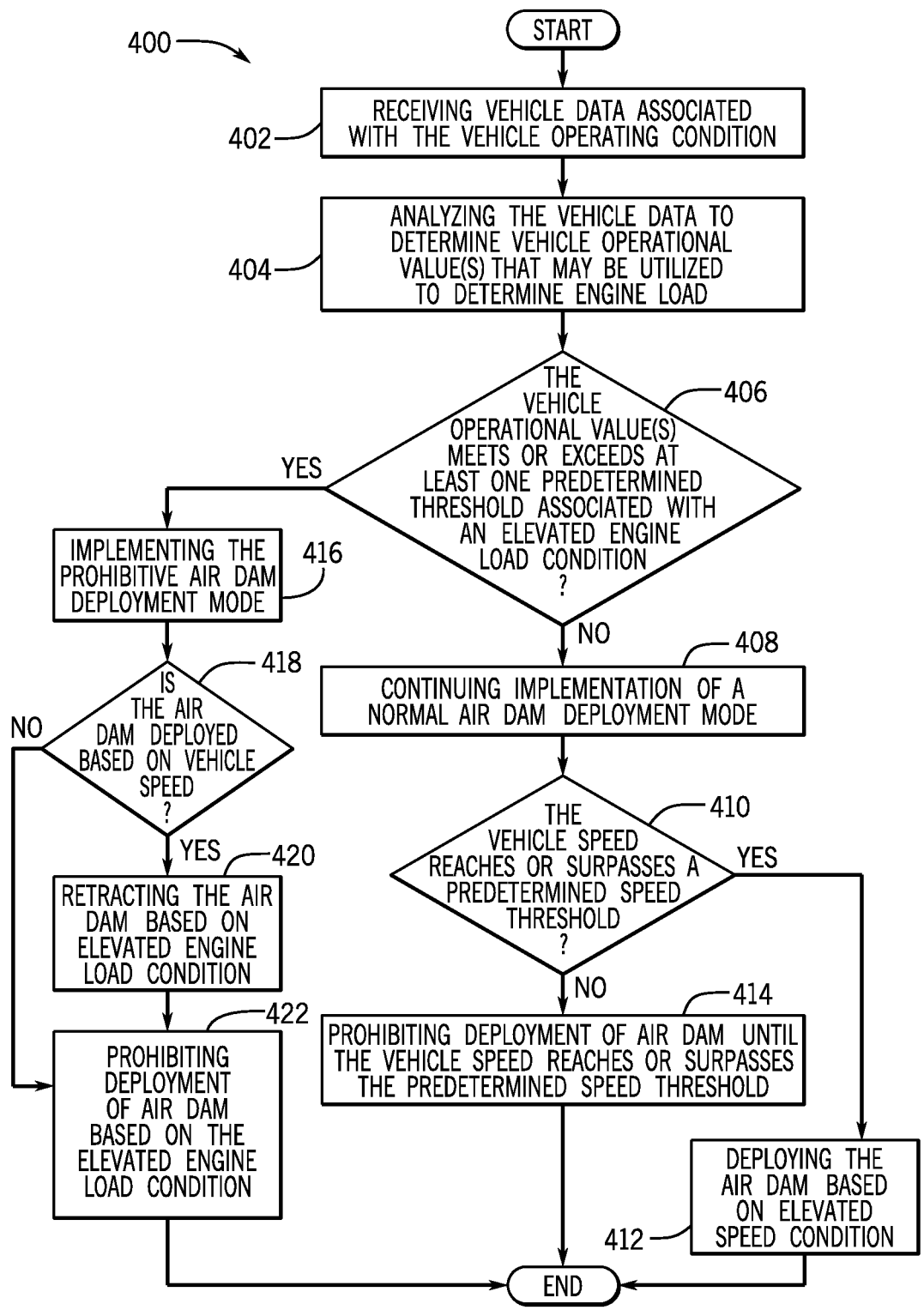
FIG. 4 is a process flow diagram of a method for implementing the normal air dam deployment mode or a prohibitive air dam deployment mode based on the determining if an elevated engine load condition is present according to an exemplary embodiment of the present disclosure.

FIG. 4 is a process flow diagram of a method 400 for implementing the normal air dam deployment mode or the prohibitive air dam deployment mode based on the determining if the elevated engine load condition is present according to an exemplary embodiment of the present disclosure. FIG. 4 will be described with reference to the components of FIG. 1, FIG. 2A, FIG. 2B, though it is to be appreciated that the method of FIG. 4 may be used with other systems/components. In one embodiment, upon enablement (e.g., ignition start) of the vehicle 102, the application 106 may implement the normal air dam deployment mode. Accordingly, deployment and retraction of the air dam 104 by the air dam control application 106 may be based on the speed of the vehicle 102. The method 400 may thereby be executed to determine if the normal air dam deployment mode is to be continued to be implemented or the prohibitive air dam deployment mode should be implemented to accordingly prohibit deployment of the air dam 104 by the application 106.

In an exemplary embodiment, the method 400 may begin at block 402, wherein the method 400 may include receiving vehicle data associated with the vehicle operating condition. In an exemplary embodiment, the vehicle data reception module 130 of the air dam control application 106 may be configured to communicate with the ECU 108 to receive vehicle data based on data that may be output by the speed sensor 116, the ECT sensor 118, the MAP sensor 120, and/or the TP sensor 122. As discussed above, each of the sensors 118-122 may output sensed data to the ECU 108 based on respective sensed vehicle operational measurements.

The method 400 may proceed to block 404, wherein the method 400 may include analyzing the vehicle data to determine vehicle operational value(s) that may be utilized to determine engine load. In one embodiment, upon receiving the vehicle operation condition data that pertains to the vehicle operating condition of the vehicle 102, the vehicle data reception module 130 may be configured to communicate respective data to the condition determinant module 132 of the air dam control application 106.

In an exemplary embodiment, the condition determinant module 132 may analyze data output by the ECT sensor 118 with respect to the real-time engine coolant reading and may determine the real-time engine coolant reading as a vehicle operational value that may be utilized to determine the engine load on the engine 110 of the vehicle 102. In an alternate embodiment, the condition determinant module 132 may analyze data output by the MAP sensor 120 and/or the TP sensor 122 and may thereby determine a real-time engine load percentage (value) based on the analysis of the real-time air intake pressure output by the MAP sensor 120 and/or the real-time throttle pressure value reading output by the TP sensor 122.

The method 400 may proceed to block 406, wherein the method 400 may include determining if the vehicle operational value(s) meets or exceeds at least one predetermined threshold associated with an elevated engine load condition. In an exemplary embodiment, upon determining the vehicle operational value(s) that may be utilized to determine the engine load, the condition determinant module 132 may be configured to compare the vehicle operational value(s) to at least one predetermined threshold associated with the elevated engine load condition.

In one embodiment, if the condition determinant module 132 determines the real-time engine coolant reading as a vehicle operational value, the module 132 may be configured to compare the real-time engine coolant reading to a predetermined coolant temperature threshold that is associated with a baseline elevated engine load to determine if the real-time engine coolant reading is equal to or above the predetermined coolant temperature threshold. In an alternate embodiment, the module 132 may be configured to compare the real-time engine load percentage as determined based on the real-time air intake pressure value reading from the MAP sensor 120 and/or the real-time throttle position value reading from TP sensor 122. In particular, the condition determinant module 132 may compare the real-time engine load percentage against the predetermined engine load threshold percentage that is associated with a baseline elevated engine load to determine if the real-time engine load percentage is equal to or above the real-time engine load threshold percentage.

If it is determined that the vehicle operational value(s) does not meet or exceed at least one predetermined threshold associated with an elevated engine load condition at block 406, the method 400 may proceed to block 408, wherein the method 400 may include continuing implementation of a normal air dam deployment mode. In one embodiment, if it is determined that the real-time engine coolant reading is below the predetermined coolant temperature threshold, the condition determinant module 132 may thereby determine that the elevated engine load condition is not present. In other words, based on the temperature of the engine coolant being below the predetermined coolant temperature threshold, the condition determinant module 132 may determine that the amount of load that is being placed upon the engine 110 is not elevated (e.g., is below a baseline elevated engine load level). Accordingly, the condition determinant module 132 may continue to implement the normal air dam deployment mode.

In an alternate embodiment, if it is determined that the real-time engine load is below the predetermined engine load threshold percentage, the condition determinant module 132 may thereby determine that an elevated engine load condition is not present (e.g., the real-time engine load is below a baseline elevated engine load level). In other words, based on the real-time engine load percentage as determined based on the real-time air intake pressure value reading from the MAP sensor 120 and/or the real-time throttle position value reading from TP sensor 122 being below the predetermined engine load threshold percentage, the condition determinant module 132 may determine that an elevated amount of load is not being placed upon the engine 110. Accordingly, the condition determinant module 132 may thereby continue to implement the normal air dam deployment mode.

The method 400 may proceed to block 410, wherein the method 400 may include determining if the vehicle speed reaches or surpasses a predetermined speed threshold. In an exemplary embodiment, the condition determinant module 132 may communicate with the vehicle data reception module 130 to determine a current speed of the vehicle 102 as output by the speed sensor 116. Upon determining the current speed of the vehicle 102, the condition determinant module 132 may compare the current speed of the vehicle 102 to the predetermined speed threshold to determine if the vehicle speed reaches and/or surpasses the predetermined speed threshold.

If it is determined that the vehicle speed reaches or surpasses the predetermined speed threshold (at block 410), the method 400 may proceed to block 412, wherein the method 400 may include deploying the air dam 104 based on an elevated speed condition. In an exemplary embodiment, upon determining that the vehicle speed reaches and/or surpasses the predetermined speed threshold, the condition determinant module 132 may communicate with the air dam control module 134 with respective data. The air dam control module 134 may accordingly communicate with the ECU 108 of the vehicle 102 to operably control the actuator 112 to deploy the air dam 104 based on the elevated speed condition. Accordingly, the air dam 104 is deployed to its lowered position to manage underbody air flow and reduce drag associated with one or more portions of the vehicle 102 while improving aerodynamic efficiency. As represented in the illustrative example of FIG. 3, the actuator 112 may be operably controlled to deploy the air dam 104 as the speed of the vehicle 102 reaches or surpassed the predetermined speed threshold (e.g., 70 KPH).

If it is determined that the vehicle speed does not reach or surpass the predetermined speed threshold (at block 410) (e.g., the air dam 104 has not been deployed based on the vehicle 102 not yet reaching or surpassing the predetermined speed threshold), the method 400 may proceed to block 414, wherein the method 400 may include prohibiting deployment of the air dam 104 until the vehicle speed reaches and/or surpasses the predetermined speed threshold. In one embodiment, upon the condition determinant module 132 determining that the vehicle speed does not reach or surpass the predetermined speed threshold, the condition determinant module 132 may communicate respective data to the air dam control module 134.

The air dam control module 134 may accordingly communicate with the ECU 108 of the vehicle 102 to operably control the actuator 112 to prohibit deployment of the air dam 104. Accordingly, the air dam 104 is prohibited from being deployed and the actuator 112 will not control deployment of the air dam 104 until the speed of the vehicle 102 reaches or surpasses the predetermined speed threshold. As shown, with reference to FIG. 3, as discussed during the normal air dam deployment mode, deployment of the air dam 104 may be prohibited as the speed of the vehicle 102 is below the predetermined speed threshold (e.g., below 70 KPH).

Referring again to block 406 of the method 400, if it is determined that the vehicle operational value(s) does meet or exceed at least one predetermined threshold, the method 400 may proceed to block 416, wherein the method 400 may include implementing the prohibitive air dam deployment mode. In one embodiment, if it is determined that the real-time engine coolant reading is equal to or above the predetermined coolant temperature threshold, the condition determinant module 132 may thereby determine that an elevated engine load condition is present. In other words, based on the temperature of the engine coolant being above the predetermined coolant temperature threshold, the condition determinant module 132 may determine that an amount of heat the engine 110 is giving off may indicate the amount of load that is being placed upon the engine 110 is elevated (e.g., above a baseline elevated engine load level). Accordingly, the condition determinant module 132 may thereby implement the prohibitive air dam deployment mode.

In an alternate embodiment, if it is determined that the real-time engine load is equal to or higher than the predetermined engine load threshold percentage, the condition determinant module 132 may thereby determine that an elevated engine load condition is present. In other words, based on the real-time engine load percentage as determined based on the real-time air intake pressure value reading from the MAP sensor 120 and/or the real-time throttle position value reading from the TP sensor 122 being above the predetermined engine load threshold percentage, the condition determinant module 132 may determine that an elevated amount of load is being placed upon the engine 110. Accordingly, the condition determinant module 132 may thereby implement the prohibitive air dam deployment mode.

The method 400 may proceed to block 418, wherein the method 400 may include determining if the air dam 104 is deployed based on the vehicle speed. As discussed above, upon enablement of the vehicle 102, the application 106 may implement the normal air dam deployment mode. Accordingly, deployment and retraction of the air dam 104 by the air dam control application 106 may be based on the speed of the vehicle 102. The condition determinant module 132 may accordingly determine if the air dam 104 has already been deployed based on the vehicle speed reaching or surpassing the predetermined speed threshold during the previous implementation of the normal air dam deployment mode. In one embodiment, the condition determinant module 132 may communicate with the ECU 108 to determine if the actuator 112 is positioned to deploy the air dam 104 to its lowered position. Accordingly, the ECU 108 may communicate the status of the air dam 104 as deployed or retracted to the condition determinant module 132.

If it is determined that the air dam 104 is deployed based on the vehicle speed (at block 418), the method 400 may proceed to block 420, wherein the method 400 may include retracting the air dam 104 based on the elevated engine load condition. In one or more embodiments, upon determining that the air dam 104 has been already deployed based on the vehicle speed reaching or surpassing the predetermined speed threshold prior to the implantation of the prohibitive air dam deployment mode, the condition determinant module 132 may communicate respective data to the air dam control module 134 of the air dam control application 106.

In one embodiment, the air dam control module 134 may responsively communicate with the ECU 108 of the vehicle 102 to control the actuator 112 associated with the air dam 104 to retract the air dam 104 from its deployed lowered position according to the prohibitive air dam deployment mode based on the d elevated engine load condition. Accordingly, the actuator 112 may operate to control retraction of the air dam 104 by retracting and moving the air dam 104 to its retracted position (shown in FIG. 2A). The application 106 accordingly ensures that the air dam 104 is thereby retracted to allow maximization of underbody airflow to underbody parts of the vehicle 102.

If it is determined that the air dam 104 is not deployed based on the vehicle speed (at block 418) or the air dam 104 is retracted based on the elevated engine load condition (at block 420), the method 400 may proceed to block 422, wherein the method 400 may include prohibiting deployment of the air dam 104 based on the elevated engine load condition. In one embodiment, upon the condition determinant module 132 determining that the air dam 104 is in a retracted position (e.g., based on the vehicle 102 not being driven to reach or surpass the predetermined speed threshold), the condition determinant module 132 may communicate respective data to the air dam control module 134.

The air dam control module 134 may accordingly communicate with the ECU 108 of the vehicle 102 to operably control the actuator 112 to prohibit deployment of the air dam 104. Accordingly, the air dam 104 is prohibited from being deployed and the actuator 112 will not control deployment of the air dam 104 even if the speed of the vehicle 102 reaches or surpasses the predetermined speed threshold.

In one or more embodiments, the air dam control application 106 may be configured to execute the method 400 continuously or repeatedly after a predetermined gap in time during the course of travel of the vehicle 102. Accordingly, the method 400 may be executed to ensure that the air dam 104 is not deployed during elevated engine load conditions to provide maximum airflow to underbody parts of the vehicle 102. Additionally, the method 400 may be executed to ensure that the air dam 104 may be deployed as needed based on the speed of the vehicle 102 when engine load conditions are not determined to be elevated to improve aero-dynamic performance of the vehicle 102 and to achieve a benefit with respect to the fuel efficiency of the vehicle 102.

Figure 5:
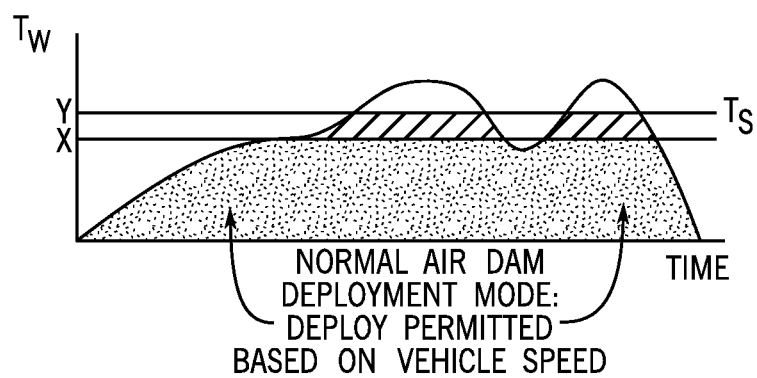
FIG. 5 is an illustrative example of an implementation of the prohibitive air dam deployment mode based on a determination of the elevated engine load condition according to an exemplary embodiment of the present disclosure.

FIG. 5 includes an illustrative example of an implementation of the prohibitive air dam deployment mode based on a determination of the elevated engine load condition according to an exemplary embodiment of the present disclosure. As shown in the illustrative example of FIG. 5, the deployment of the air dam 104 may be prohibited during implementation of the prohibitive air dam deployment mode based on the engine coolant temperature sensed by the ECT sensor 118 being above the predetermined coolant temperature threshold (e.g., that may be included as part of a variable temperature range) as this may indicate an elevated engine load (hysteresis illustrated by the area between X and Y). Furthermore, as shown, the deployment of the air dam 104 may be permitted based on the speed of the vehicle 102 during implementation of the normal air dam deployment mode based on the engine coolant temperature being below the predetermined coolant temperature threshold as this may indicate an engine load which is not elevated (e.g., average load on the engine 110 of the vehicle 102).

Figure 6:
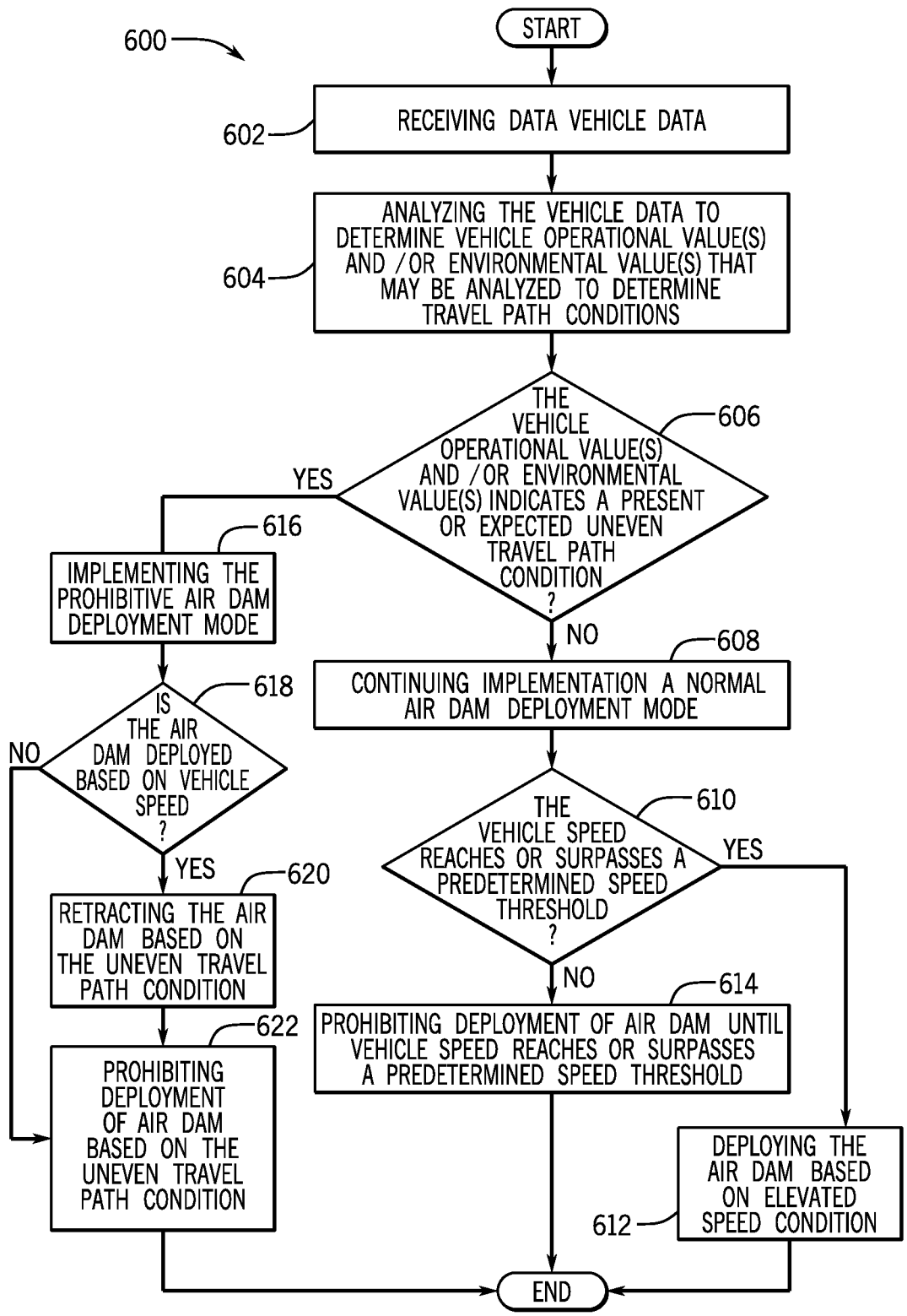
FIG. 6 is a process flow diagram of a method for implementing the normal air dam deployment mode or the prohibitive air dam deployment mode based on the determining if an uneven travel path condition is present or expected according to an exemplary embodiment of the present disclosure.

FIG. 6 is a process flow diagram of a method 600 for implementing the normal air dam deployment mode or the prohibitive air dam deployment mode based on the determining if the uneven travel path condition is present or expected according to an exemplary embodiment of the present disclosure. FIG. 6 will be described with reference to the components of FIG. 1, FIG. 2A, FIG. 2B, though it is to be appreciated that the method of FIG. 6 may be used with other systems/components. In one embodiment, upon enablement (e.g., ignition start) of the vehicle 102, the application 106 may implement the normal air dam deployment mode. Accordingly, deployment and retraction of the air dam 104 by the air dam control application 106 may be based on the speed of the vehicle 102. The method 600 may thereby be executed to determine if the normal air dam deployment mode is to be continued to be implemented or the prohibitive air dam deployment mode should be implemented to accordingly control deployment and/or retraction of the air dam 104 by the application 106.

In an exemplary embodiment, the method 600 may begin at block 602, wherein the method 600 may include receiving vehicle data. In one embodiment, the vehicle data reception module 130 of the air dam control application 106 may be configured to communicate with the ECU 108 to receive vehicle operation condition data based on data that may be output by the speed sensor 116, the VS system 124, the climate sensor 126, and/or the road surface sensor 128. As discussed above, the speed sensor 116, the VS system 124, the climate sensor 126, and/or the road surface sensor 128 may output data to the ECU 108 based on respective determined and/or sensed conditions.

The method 600 may proceed to block 604, wherein the method 600 may include analyzing the vehicle data to determine vehicle operational value(s) and/or environmental value(s) that may be analyzed to determine a travel path condition. In one embodiment, upon receiving the vehicle data, the vehicle data reception module 130 may be configured to communicate respective data to the condition determinant module 132 of the air dam control application 106.

In an exemplary embodiment, the condition determinant module 132 may analyze data output by the VS system 124 and may analyze such information to determine vehicle operational values and/or environmental values that may be analyzed to determine the travel path condition. As discussed above, the VS system 124 may be configured to provide data that may be analyzed to determine when a predetermined amount of wheel slip may be determined by the VS system 124. In one embodiment, the condition determinant module 132 may analyze data received from the VS system 124 to determine the amount of wheel slip of one or more wheels of the vehicle 102 and may thereby determine if the amount of wheel slip output by the VS system 124 as a vehicle operational value that may be utilized to determine if an uneven travel path condition is present or is expected.

In another embodiment, the condition determinant module 132 may analyze data output by the climate sensor 126 and may analyze such information to determine vehicle operational values and/or environmental values that may be analyzed to determine the travel path condition. As discussed above, the climate sensor 126 may be configured to sense an outside ambient temperature within the surrounding environment of the vehicle 102. In an alternate embodiment, the climate sensor 126 may be configured to send a state of precipitation along with the outside ambient temperature within the surrounding environment of the vehicle 102. In one configuration, the condition determinant module 132 may analyze the data received from the climate sensor 126 and may determine the outside ambient temperature output by the climate sensor 126 as an environmental value that may be utilized to determine if an uneven travel path condition is present or is expected.

In another embodiment, the condition determinant module 132 may analyze data output by the road surface sensor 128 and may analyze such information to determine vehicle operational values and/or environmental values that may be analyzed to determine the travel path condition. As discussed above, the road surface sensor may output a travel path condition value that pertains to an amount of travel path unevenness that is expected in front of the vehicle 102 and/or is determined (in real-time) as the vehicle 102 is traveling on the travel path. In particular, the travel path condition value may be output based on the utilization of one or more cameras, lasers, LIDARs, and/or the suspension height measurement devices that determine changes in the height of a suspension system of the vehicle 102. In one configuration, the condition determinant module 132 may analyze the data received from the road surface sensor 128 as a vehicle operational value (based on data provided by the suspension height measurement devices) and/or as an environmental value (based on data provided by the camera(s), lasers, and/or LiDARs) that may be utilized to determine if an uneven travel path condition exists or is expected.

The method 600 may proceed to block 606, wherein the method 600 may include determining if the vehicle operational value(s) and/or the environmental value(s) indicate a present or expected uneven travel path condition. In an exemplary embodiment, upon determining the vehicle operational value(s) and/or environmental value(s) that may be utilized to determine if an uneven travel path condition exists or is expected, the condition determinant module 132 may be configured to compare the vehicle operational value(s) and/or environmental value(s) to at least one predetermined threshold associated with a present or expected baseline level of unevenness of the travel path.

In one embodiment, upon determining that the amount of wheel slip output by the VS system 124 as a vehicle operational value, the condition determinant module 132 may be configured to compare the amount of wheel slip against the predetermined wheel slip threshold that is associated with the present or expected baseline level of unevenness of the travel path. In particular, the module 132 may compare the amount of wheel slip against the predetermined wheel slip threshold to determine if the amount of wheel slip output by the VS system 124 meets or exceeds the predetermined wheel slip threshold associated the an uneven travel path condition (e.g., that may be caused by weather conditions such as snow and sleet or road conditions such as rocks, gravel, or potholes). In one configuration, if the amount of wheel slip output by the VS system 124 meets or exceeds the predetermined wheel slip threshold that is associated with the uneven travel path condition, the condition determinant module 132 may determine that the vehicle operational value(s) indicates a present or expected uneven travel path condition.

In an additional embodiment, upon determining the outside ambient temperature received from the climate sensor 126 as an environmental variable value, the condition determinant module 132 may be configured to compare the outside ambient temperature against the predetermined ambient temperature threshold associated with a present or expected baseline level of unevenness of the travel path. In particular, the module 132 may compare the outside ambient temperature against the predetermined ambient temperature threshold to determine if the outside ambient temperature output by the climate sensor 126 is equal or below the predetermined ambient temperature threshold associated with an expected and/or present extent of unevenness of the travel path (e.g., that may be caused by weather conditions such as snow, sleet, and the like). In one embodiment, if the outside ambient temperature is equal to or below the predetermined ambient temperature threshold associated with an expected and/or present extent of unevenness of the travel path, the condition determinant module 132 may determine that the environmental value(s) indicates a present or expected uneven travel path condition. In an alternate embodiment, upon determining the travel path condition value that indicates an amount of travel path unevenness that is expected in front of the vehicle 102 and/or is determined (in real-time) as the vehicle 102 is traveling on the travel path output by the road surface sensor 128 as an environmental variable value, the condition determinant module 132 may compare the environmental variable value to the predetermined travel path unevenness threshold associated with a present or expected baseline level of unevenness of the travel path.

In particular, the module 132 may compare the travel path condition value against the predetermined travel path unevenness threshold value to determine if the travel path condition value meets or exceeds the predetermined travel path unevenness threshold value associated with a present or expected baseline level of unevenness of the travel path (e.g., that may be caused by potholes, speed bumps, and the like). In one configuration, if the travel path condition value output by the VS system 124 meets or exceeds the predetermined travel path unevenness threshold value associated with the present or expected baseline level of unevenness of the travel path, the condition determinant module 132 may determine that the environmental value(s) indicates a present or expected uneven travel path condition.

If it is determined that the vehicle operational value(s) and/or the environmental value(s) do not indicate a present or expected uneven travel path condition (at block 606), the method 600 may proceed to block 608, wherein the method 600 may include continuing implementation of a normal air dam deployment mode. In one embodiment, if it is determined that the amount of wheel slip is below the predetermined wheel slip threshold, the condition determinant module 132 may thereby determine that the uneven travel path condition is not present or expected. In other words, based on the amount of wheel slip being below the predetermined wheel slip threshold, the condition determinant module 132 may determine that there are not any conditions present or expected that may contribute to an uneven travel path that may include one or more potential obstructions during deployment of the air dam 104. Accordingly, the condition determinant module 132 may continue to implement the normal air dam deployment mode.

In an additional embodiment, if it is determined that the outside ambient temperature output by the climate sensor 126 is above the predetermined ambient temperature threshold, the condition determinant module 132 may thereby determine that the uneven travel path condition is not present or expected. In other words, based on the ambient temperature being above the predetermined ambient temperature threshold, the module 132 may determine that there are not any weather conditions present or expected that may contribute to an uneven travel path that may include one or more potential obstructions that may potentially obstruct the air dam 104 during deployment. Accordingly, the condition determinant module 132 may continue to implement the normal air dam deployment mode.

In an alternate embodiment, if it is determined that the travel path condition value output by the road surface sensor 128 is below the predetermined travel path unevenness threshold value, the condition determinant module 132 may determine that the uneven travel path condition is not present or expected. In other words, based on the travel path condition value being below the predetermined travel path unevenness threshold value, the module 132 may determine that there are not any conditions present or expected that may include one or more potential obstructions that may potentially obstruct the air dam 104 during deployment. Accordingly, the condition determinant module 132 may continue to implement the normal air dam deployment mode.

The method 600 may proceed to block 610, wherein the method 600 may include determining if the vehicle speed reaches or surpasses a predetermined speed threshold. In an exemplary embodiment, the condition determinant module 132 may communicate with the vehicle data reception module 130 to determine a current speed of the vehicle 102 as output by the speed sensor 116. Upon determining the current speed of the vehicle 102, the condition determinant module 132 may compare the current speed of the vehicle 102 to the predetermined speed threshold to determine if the vehicle speed reaches and/or surpasses the predetermined speed threshold.

If it is determined that the vehicle speed reaches or surpasses the predetermined speed threshold (at block 610), the method 600 may proceed to block 612, wherein the method 600 may include deploying the air dam 104 based on an elevated speed condition. In an exemplary embodiment, upon determining that the vehicle speed reaches and/or surpasses the predetermined speed threshold, the condition determinant module 132 may communicate with the air dam control module 134 with respective data. The air dam control module 134 may accordingly communicate with the ECU 108 of the vehicle 102 to operably control the actuator 112 to deploy the air dam 104 based on the elevated speed condition. Accordingly, the air dam 104 is deployed to its lowered position to manage underbody air flow and reduce drag associated with one or more portions of the vehicle 102 while improving aerodynamic efficiency.

If it is determined that the vehicle speed does not reach or surpass the predetermined speed threshold (at block 610)

(e.g., the air dam 104 has not been deployed based on the vehicle 102 not yet reaching or surpassing the predetermined speed threshold), the method 600 may proceed to block 614, wherein the method 600 may include prohibiting deployment of the air dam 104 until the vehicle speed reaches and/or surpasses the predetermined speed threshold. In one embodiment, upon the condition determinant module 132 determining that the vehicle speed does not reach or surpass the predetermined speed threshold, the condition determinant module 132 may communicate respective data to the air dam control module 134.

The air dam control module 134 may accordingly communicate with the ECU 108 of the vehicle 102 to operably control the actuator 112 to prohibit deployment of the air dam 104. Accordingly, the air dam 104 is prohibited from being deployed and the actuator 112 will not control deployment of the air dam 104 until the speed of the vehicle 102 reaches or surpasses the predetermined speed threshold.

Referring again to block 606 of the method 600, if it is determined that the vehicle operational value(s) and/or environmental value(s) indicates a present or expected uneven travel path condition, the method 600 may proceed to block 616, wherein the method 600 may include implementing the prohibitive air dam deployment mode. In one embodiment, as discussed above, based on the determination that the amount of wheel slip output by the VS system 124 meets or exceeds the predetermined wheel slip threshold associated with the uneven travel path condition, the condition determinant module 132 may determine that the vehicle operational value(s) indicates a present or expected uneven travel path condition. Accordingly, the condition determinant module 132 may implement the prohibitive air dam deployment mode to prohibit the air dam 104 from deploying to protect the air dam 104 against one or more potential obstructions of the present or expected uneven travel path.

In another embodiment, as discussed above, if the outside ambient temperature is equal to or below the predetermined ambient temperature threshold associated with an expected and/or present extent of unevenness of the travel path, the condition determinant module 132 may determine that the environmental value(s) indicates a present or expected uneven travel path condition. Accordingly, the condition determinant module 132 may implement the prohibitive air dam deployment mode to prohibit the air dam 104 from deployment to protect the air dam 104 against one or more potential obstructions of the present or expected uneven travel path.

In an alternate embodiment, as discussed above, if the travel path condition value output by the VS system 124 meets or exceeds the predetermined travel path unevenness threshold value associated the an uneven travel path condition, the condition determinant module 132 may determine that the environmental value(s) indicates a present or expected uneven travel path condition. Accordingly, the condition determinant module 132 may implement the prohibitive air dam deployment mode to prohibit the air dam 104 from deployment to protect the air dam 104 against one or more potential obstructions of the present or expected uneven travel path.

The method 600 may proceed to block 618, wherein the method 600 may include determining if the air dam 104 is deployed based on the vehicle speed. As discussed above, upon enablement of the vehicle 102, the application 106 may implement the normal air dam deployment mode. Accordingly, deployment and retraction of the air dam 104 by the air dam control application 106 may be based on the speed of the vehicle 102. The condition determinant module 132 may accordingly determine if the air dam 104 has already been deployed based on the vehicle speed reaching or surpassing the predetermined speed threshold. In one embodiment, the condition determinant module 132 may communicate with the ECU 108 to determine if the actuator 112 is positioned to deploy the air dam 104 to its lowered position. Accordingly, the ECU 108 may communicate the status of the air dam 104 as deployed or retracted to the condition determinant module 132.

If it is determined that the air dam 104 is deployed based on the vehicle speed (at block 618), the method 600 may proceed to block 620, wherein the method 600 may include retracting the air dam 104 based on the uneven travel path condition. In one or more embodiments, upon determining that the air dam 104 has been already deployed based on the vehicle speed reaching or surpassing the predetermined speed threshold prior to the implantation of the prohibitive air dam deployment mode, the condition determinant module 132 may communicate respective data to the air dam control module 134 of the air dam control application 106.

In one embodiment, the air dam control module 134 may responsively communicate with the ECU 108 of the vehicle 102 to control the actuator 112 associated with the air dam 104 to retract the air dam 104 from its deployed lowered position according to the prohibitive air dam deployment mode based on the present or expected uneven travel path condition. Accordingly, the actuator 112 may operate to control retraction of the air dam 104 by retracting and moving the air dam 104 to its retracted position (shown in FIG. 2A). The application 106 accordingly ensures that the air dam 104 is thereby retracted to protect the air dam 104 against one or more potential obstructions of the present or expected uneven travel path condition.

If it is determined that the air dam 104 is not deployed based on the vehicle speed (at block 618) or the air dam 104 is retracted based on the uneven travel path condition (at block 620), the method 600 may proceed to block 622, wherein the method 600 may include prohibiting deployment of the air dam 104 based on the uneven travel path condition. In one embodiment, upon the condition determinant module 132 determining that the air dam 104 is in a retracted position, the condition determinant module 132 may communicate respective data to the air dam control module 134.

The air dam control module 134 may accordingly communicate with the ECU 108 of the vehicle 102 to operably control the actuator 112 to prohibit deployment of the air dam 104. Accordingly, the air dam 104 is prohibited from being deployed and the actuator 112 will not control deployment of the air dam 104 even if the speed of the vehicle 102 reaches or surpasses the predetermined speed threshold.

In one or more embodiments, the air dam control application 106 may be configured to execute the method 600 continuously or repeatedly after a predetermined gap in time during the course of travel of the vehicle 102. Accordingly, the method 600 may be executed to ensure that the air dam 104 is not deployed during a present or an expected uneven travel path condition to protect the air dam 104 against one or more potential obstructions of the uneven travel path condition. Also, the method 600 may be executed to ensure that the air dam 104 may be deployed as needed based on the speed of the vehicle 102 when uneven travel path conditions are not present and/or expected to improve aero-dynamic performance of the vehicle 102 and to achieve a benefit with respect to the fuel efficiency of the vehicle 102.

Figure 7:
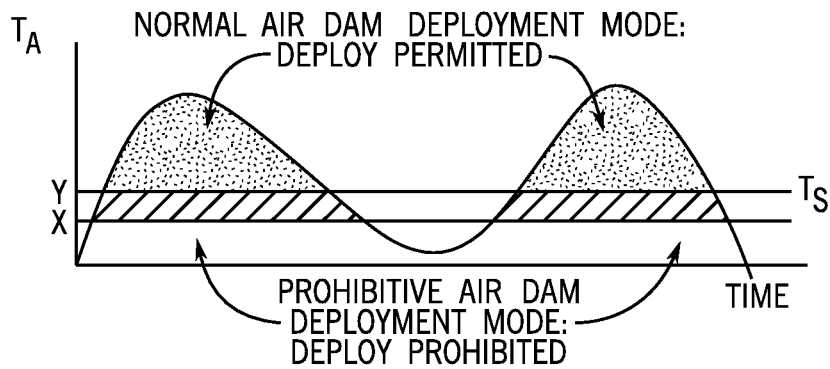
FIG. 7 is an illustrative example of an implementation of the prohibitive air dam deployment mode based on a determination of a present or expected uneven travel path condition according to an exemplary embodiment of the present disclosure.

FIG. 7 includes an illustrative example of an implementation of the prohibitive air dam deployment mode based on the determination of a present or expected uneven travel path condition according to an exemplary embodiment of the present disclosure. As shown in the illustrative example of FIG. 7, the deployment of the air dam 104 may be prohibited during implementation of the prohibitive air dam deployment mode based on a determination that an outside ambient temperature sensed by the climate sensor 126 is equal to or falls below the predetermined ambient temperature threshold (e.g., that may be included as part of a variable temperature range) that may be associated with a baseline level of unevenness of the travel path (e.g., caused by snow buildup). Also, as shown, the deployment of the air dam 104 may be permitted based on the speed of the vehicle 102 during implementation of the normal air dam deployment mode if the outside ambient temperature is above the predetermined ambient temperature threshold that may indicate that the vehicle 102 is not traveling on and/or is not expected to travel on an uneven travel pathway that may include one or more potential obstructions to the air dam 104 during its deployment (hysteresis illustrated by the area between X and Y).

In one or more embodiments, the air dam control application 106 may execute the method 400 and method 600 in conjunction to ensure that that the air dam 104 is not deployed during elevated engine load conditions to protect underbody parts of the vehicle 102 from an elevated level of heat and that the air dam 104 is not deployed during determined or expected uneven travel path conditions to protect the air dam 104 against potential impact caused by one or more potential obstructions of the uneven travel path condition. Accordingly, the application 106 may also ensure that the air dam 104 may be deployed as needed based on the speed of the vehicle 102 when engine load conditions are not determined to be elevated and the travel path on which the vehicle 102 is traveling is not presently uneven or is not expected to be uneven to improve aero-dynamic performance of the vehicle 102 and to achieve a benefit with respect to the fuel efficiency of the vehicle 102.

Figure 8:
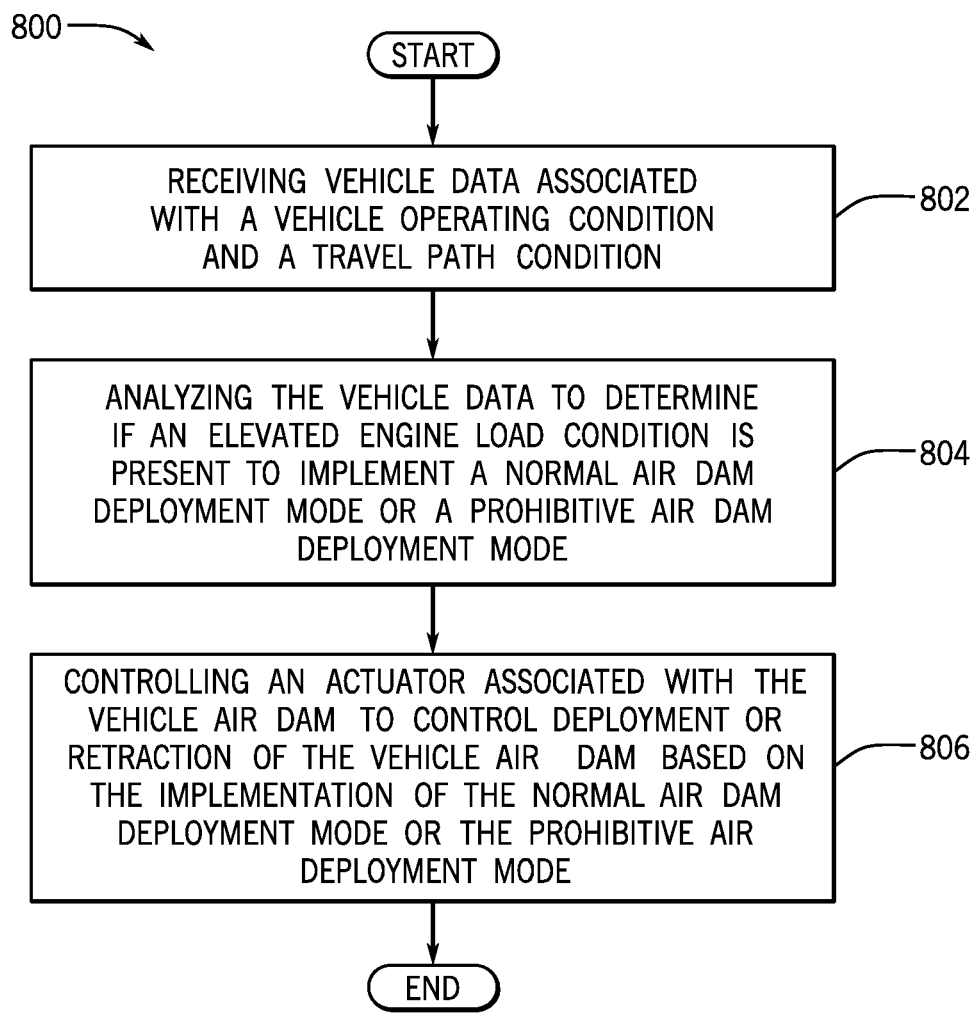
FIG. 8 is a process flow diagram of a method for controlling deployment of the vehicle air dam according to an exemplary embodiment of the present disclosure.

FIG. 8 is a process flow diagram of a method 800 for controlling deployment of the vehicle air dam 104 according to an exemplary embodiment of the present disclosure. FIG. 8 will be described with reference to the components of FIG. 1, FIG. 2A, FIG. 2B, though it is to be appreciated that the method of FIG. 8 may be used with other systems/components. The method 800 may begin at block 802, wherein the method 800 may include receiving vehicle data associated with a vehicle operating condition and a travel path condition.

The method 800 may proceed to block 804, wherein the method 800 may include analyzing the vehicle data to determine if an elevated engine load condition is present to implement a normal air dam deploy mode or a prohibitive air dam deployment mode. As discussed, deployment of the air dam 104 is prohibited during the implementation of the prohibitive air dam deployment mode and deployment of the air dam 104 is based on the speed of the vehicle 102 during the normal air dam deployment mode. The method 800 may proceed to block 806, wherein the method 800 may include controlling an actuator 112 associated with the vehicle air dam 104 to control deployment or retraction of the vehicle air dam 104 based on the implementation of the normal air dam deployment mode or the prohibitive air dam deployment mode.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling deployment of a vehicle air dam, comprising:
   receiving vehicle data associated with a vehicle operating condition, wherein a real-time air intake pressure value reading and a real-time throttle position value reading are analyzed to determine a real-time engine load percentage;
   analyzing the vehicle data by comparing the real-time engine load percentage to a predetermined engine load threshold percentage to determine if the real-time engine load percentage is equal to or above the predetermined engine load threshold percentage, wherein the deployment of the vehicle air dam is based on a speed of a vehicle, a vehicle transmission mode of the vehicle, and on the real-time engine load percentage being below the predetermined engine load threshold percentage, wherein the deployment of the vehicle air dam is prohibited based on the real-time engine load percentage being equal to or above the predetermined engine load threshold percentage; and
   controlling an actuator associated with the vehicle air dam to deploy or retract the vehicle air dam based on the speed of the vehicle, the transmission mode of the vehicle and the real-time engine load percentage being below, equal to, or above the predetermined engine load threshold percentage, wherein the actuator is connected to a linkage and is configured to be extended during deployment of the air dam and retracted during retraction of the air dam, wherein the linkage is connected to a clutch that is configured to be disengaged and re-engaged protect the actuator against a range of potential impact loads on the air dam.

2. The computer-implemented method of claim 1, wherein receiving vehicle data associated with the vehicle operating condition includes receiving an engine coolant temperature reading from an engine coolant temperature sensor.

3. The computer-implemented method of claim 2, wherein analyzing the vehicle data to determine if an elevated engine load condition is present includes analyzing the engine coolant temperature reading as a vehicle operational value that is utilized to determine if the elevated engine load condition is present.

4. The computer-implemented method of claim 3, wherein analyzing the vehicle data to determine if the elevated engine load condition is present includes comparing the engine coolant temperature reading to a predetermined coolant temperature threshold that is associated with a baseline elevated engine load.

5. The computer-implemented method of claim 4, wherein it is determined that the elevated engine load condition is present based on determining that the engine coolant temperature reading meets or surpasses the predetermined coolant temperature threshold.

6. The computer-implemented method of claim 1, wherein controlling the actuator associated with the vehicle air dam includes controlling the actuator to deploy the vehicle air dam based on determining that the speed of the vehicle meets or surpasses a predetermined speed threshold and based on the vehicle transmission mode of the vehicle.

7. The computer-implemented method of claim 1, wherein controlling the actuator associated with the vehicle air dam includes controlling the actuator to deploy or retract the air dam based on a vehicle driving style mode of the vehicle, wherein the vehicle driving style mode includes at least one of a fuel efficient mode and a sport driving operational mode.

8. A computer-implemented method for controlling deployment of a vehicle air dam, comprising:
  receiving vehicle data associated with a vehicle operating condition;
  analyzing the vehicle data to determine if an uneven travel path condition is expected and comparing a real-time engine load percentage to a predetermined engine load threshold percentage to determine if the real-time engine load percentage is equal to or above the predetermined engine load threshold percentage to implement a normal air dam deployment mode or a prohibitive air dam deployment mode, wherein the deployment of the vehicle air dam is based on a speed of a vehicle and based on a vehicle transmission mode of the vehicle during implementation of the normal air dam deployment mode, wherein the deployment of the vehicle air dam is prohibited during the implementation of the prohibitive air dam deployment mode based on the determination that the uneven travel path condition is expected that is caused by at least one of: road conditions and environmental conditions that occur at a future point in time and on the real-time engine load percentage associated with an engine load of an engine of the vehicle being equal to or above the predetermined engine load threshold percentage, wherein the determination that the uneven travel path condition is expected is based on comparing a travel path condition value that indicates an amount of travel path unevenness that is expected in front of the vehicle against a predetermined travel path unevenness threshold value that pertains to an expected baseline level of unevenness of the travel path to determine if the travel path condition value meets or exceeds the predetermined travel path unevenness threshold value; and
  controlling an actuator associated with the vehicle air dam to deploy or retract the vehicle air dam based on the implementation of the normal air dam deployment mode or the prohibitive air dam deployment mode.

9. The computer-implemented method of claim 8, wherein analyzing the vehicle data to determine if the uneven travel path condition expected includes analyzing vehicle data output by a vehicle stability system to determine an amount of wheel slip of at least one wheel of the vehicle as a vehicle operational value, wherein the amount of wheel slip of the at least one wheel of the vehicle is compared to a predetermined wheel slip threshold that is associated with the expected baseline level of unevenness of the travel path.

10. The computer-implemented method of claim 9, wherein it is determined that the uneven travel path condition is expected based on determining that the amount of wheel slip of the at least one wheel of the vehicle meets or surpasses the predetermined wheel slip threshold.

11. The computer-implemented method of claim 10, wherein analyzing the vehicle data to determine the uneven travel path condition is expected includes analyzing data output by a climate sensor to determine an outside ambient temperature as an environmental value, wherein the outside ambient temperature is compared to a predetermined ambient temperature threshold that is associated with the expected baseline level of unevenness of the travel path.

12. The computer-implemented method of claim 11, wherein it is determined that the uneven travel path condition is expected based on determining that the outside ambient temperature is below or meets the predetermined ambient temperature threshold.

13. The computer-implemented method of claim 8, wherein controlling the actuator associated with the vehicle air dam includes controlling the actuator to deploy the vehicle air dam during the implementation of the normal air dam deployment mode based on determining that the speed of the vehicle meets or surpasses a predetermined speed threshold and based on the vehicle transmission mode of the vehicle.

14. The computer-implemented method of claim 13, wherein controlling the actuator associated with the vehicle air dam during implementation of the prohibitive air dam deployment mode includes controlling the actuator to retract the vehicle air dam based on determining that the vehicle air dam is already deployed based on the speed of the vehicle during a prior implementation of the normal air dam deployment mode.

15. A system for controlling deployment of a vehicle air dam, comprising:
  a memory storing instructions when executed by a processor cause the processor to:
  receive vehicle data from at least one sensor of a vehicle, wherein the vehicle data is associated with a vehicle operating condition, wherein a real-time air intake pressure value reading and a real-time throttle position value reading are analyzed to determine a real-time engine load percentage;
  analyze the vehicle data by comparing the real-time engine load percentage to a predetermined engine load threshold percentage to determine if the real-time engine load percentage is equal to or above the predetermined engine load threshold percentage, wherein the deployment of the vehicle air dam is based on a speed of a vehicle, a vehicle transmission mode of the vehicle, and on the real-time engine load percentage being below the predetermined engine load threshold percentage, wherein the deployment of the vehicle air dam is prohibited based on the real-time engine load percentage being equal to or above the predetermined engine load threshold percentage; and control an actuator associated with the vehicle air dam to deploy or retract the vehicle air dam based on the speed of the vehicle, the transmission mode of the vehicle, and the real-time engine load percentage being below, equal to, or above the predetermined engine load threshold percentage, wherein the actuator is connected to a linkage that is connected to a clutch and is configured to be extended during deployment of the air dam and retracted during retraction of the air dam, wherein the linkage is connected to a clutch that is configured to be disengaged and re-engaged to protect the actuator against a range of potential impact loads on the air dam.

16. The system of claim 15, wherein receiving vehicle data associated with the vehicle operating condition includes receiving an engine coolant temperature reading from an engine coolant temperature sensor.

17. The system of claim 16, wherein analyzing the vehicle data to determine if an elevated engine load condition is present includes analyzing the engine coolant temperature reading as a vehicle operational value that is utilized to determine if the elevated engine load condition is present.

18. The system of claim 17, wherein analyzing the vehicle data to determine if the elevated engine load condition is present includes comparing the engine coolant temperature reading to a predetermined coolant temperature threshold that is associated with a baseline elevated engine load.

19. The system of claim 18, wherein it is determined that the elevated engine load condition is present based on determining that the engine coolant temperature reading meets or surpasses the predetermined coolant temperature threshold.

20. The system of claim 15, wherein controlling the actuator associated with the vehicle air dam includes controlling the actuator to deploy or retract the air dam based on and a vehicle driving style mode of the vehicle, wherein the vehicle driving style mode includes at least one of a fuel efficient mode and a sport driving operational mode.

* * * * *